United States Patent
Baret et al.

[11] Patent Number: 5,553,918
[45] Date of Patent: Sep. 10, 1996

[54] CONVERTIBLE SEAT STRUCTURE AND THE APPLICATION THEREOF IN PARTICULAR IN A MOTOR VEHICLE

[75] Inventors: Frédéric L. R. Baret; François Fourrey, both of Montargis; Nathalie F. Humiliere, Lorris, all of France

[73] Assignee: CESA - Compagnie Europeenne de Sieges pour Automobiles, Levallois-Perret Cedex, France

[21] Appl. No.: 417,063

[22] Filed: Apr. 5, 1995

[30] Foreign Application Priority Data

Apr. 6, 1994 [FR] France ................. 94 04043

[51] Int. Cl.$^6$ ................................... B60N 2/30
[52] U.S. Cl. ...................................... 297/237
[58] Field of Search ..................... 297/236, 237, 297/15, 115

[56] References Cited

U.S. PATENT DOCUMENTS

| | | | |
|---|---|---|---|
| 5,265,934 | 11/1993 | Forget | 297/237 |
| 5,282,666 | 2/1994 | Demick et al. | 297/237 |

FOREIGN PATENT DOCUMENTS

| | | | |
|---|---|---|---|
| 556511 | 8/1993 | European Pat. Off. | |
| 2613672 | 10/1988 | France | |
| 2677588 | 12/1992 | France | |
| 2692209 | 12/1993 | France | |
| 2693688 | 1/1994 | France | |
| 3020212 | 12/1981 | Germany | 297/237 |
| 3715312 | 11/1987 | Germany | 297/237 |
| 156836 | 9/1984 | Japan | 297/237 |

*Primary Examiner*—Peter R. Brown
*Attorney, Agent, or Firm*—Sughrue, Mion, Zinn, Macpeak & Seas

[57] ABSTRACT

The seat structure comprises a base (10), a backrest (20) with a cushion (22), a seat (30) with a cushion (32) which has an upper face (3201) and a lower face (3202) and is divided into a fixed rear section (321) close to the backrest (20) and a front section (322) which is mounted to be movable between a normal adult position and an auxiliary child position by means of an articulation (40). This articulation (40) comprises a linkage (41) arranged in such manner that, in said normal position, the movable front section (322) is in the extension of the fixed rear section (321) and in such manner that, in the auxiliary position, the movable front section (322) is placed above the fixed rear section (321) after a rotation and a turning over upper face-down of the movable front section. A support (50) and a lock (60) maintain the movable front section in the auxiliary position. Application for example to a seat structure for a rear seat of a motor vehicle.

20 Claims, 6 Drawing Sheets

CONVERTIBLE SEAT STRUCTURE AND THE APPLICATION THEREOF IN PARTICULAR IN A MOTOR VEHICLE

The present invention relates to convertible seat structures and more particularly those capable of occupying two different positions for receiving as desired either an adult or a child, and the application of such a seat structure in a motor vehicle, in particular a ground motor vehicle, for example for a rear seat.

Convertible seat structures and in particular those capable of receiving as desired either an adult or a child without necessity to equip them with special accessories are well known. Such seats have a particular application in motor vehicles, in particular ground motor vehicles, especially for a rear seat.

Various arrangements have already been proposed. One type of arrangement concerns a seat structure whose seat proper is in two parts, namely a fixed rear part and a movable front part mounted by means of two pairs of lateral links which are disposed in the form of a pseudo-parallelogram to permit a rotation with a raising of the level of the movable front part relative to the fixed rear part. Embodiments are for example disclosed in the documents FR 2 613 672, 2 677 588 and 2 692 209. Another type of arrangement concerns a seat structure whose backrest is in two parts, namely a fixed upper part and a movable lower part mounted in the same way as a flap of a writing desk and retained by lateral chains, a scissor type device or the like. Embodiments are for example disclosed in the document 2 693 688.

Although such types of arrangements are relatively satisfactory they are not perfect since, for reasons of size, the extent of the change in the level of the movable part is relatively limited and also because none of these arrangements provides a suitable lateral maintenance of a child seated on the movable part when such a convertible seat structure is placed in the position in which it can receive a child.

An object of the invention is to overcome most of these briefly mentioned drawbacks with a simple convertible seat structure which takes up a small amount of place, is easy to employ, meets all the safety standards laid down by the authorities or professional bodies, and is of a relatively modest cost as concerns manufacture and assembly while still affording maximum comfort, including in the position in which it is capable of receiving an adult passenger.

The invention therefore provides a convertible seat structure which comprises a base, a backrest with a frame for receiving a cushion, a seat with a frame for receiving a cushion which has an upper face and a lower face and is divided into a fixed rear section close to the backrest and a front section which is mounted to be movable between a normal position in which the seat structure is capable of receiving an adult passenger and an auxiliary position in which the seat is capable of receiving a child passenger, by means of an articulation which interconnects said base and said movable front section. Such a seat structure is characterized in that said articulation comprises a linkage having two opposite end portions, one of said end portions being connected to said base by a transverse pin and the other of said end portions being connected to said movable front section by another transverse pin, whereby, in the normal position, the movable front section is in the extension of the fixed rear section and, in said auxiliary position, the movable front section is located above the fixed rear section after rotation about said two pins and a turning over upper face-down about said pin connecting the linkage to the movable front section, said seat structure comprising a support for defining the auxiliary position after the rotation and tilting of the movable front section, and a lock for immobilizing the movable front section at least after the rotation and tilting to the auxiliary position.

The invention also provides the application of a seat structure of the aforementioned type in a motor vehicle, in particular a ground or road motor vehicle, preferably for a rear seat.

Further features of the invention will be apparent from the following description and claims with reference to the accompanying drawing which is given solely by way of example and in which:

Figure 1:
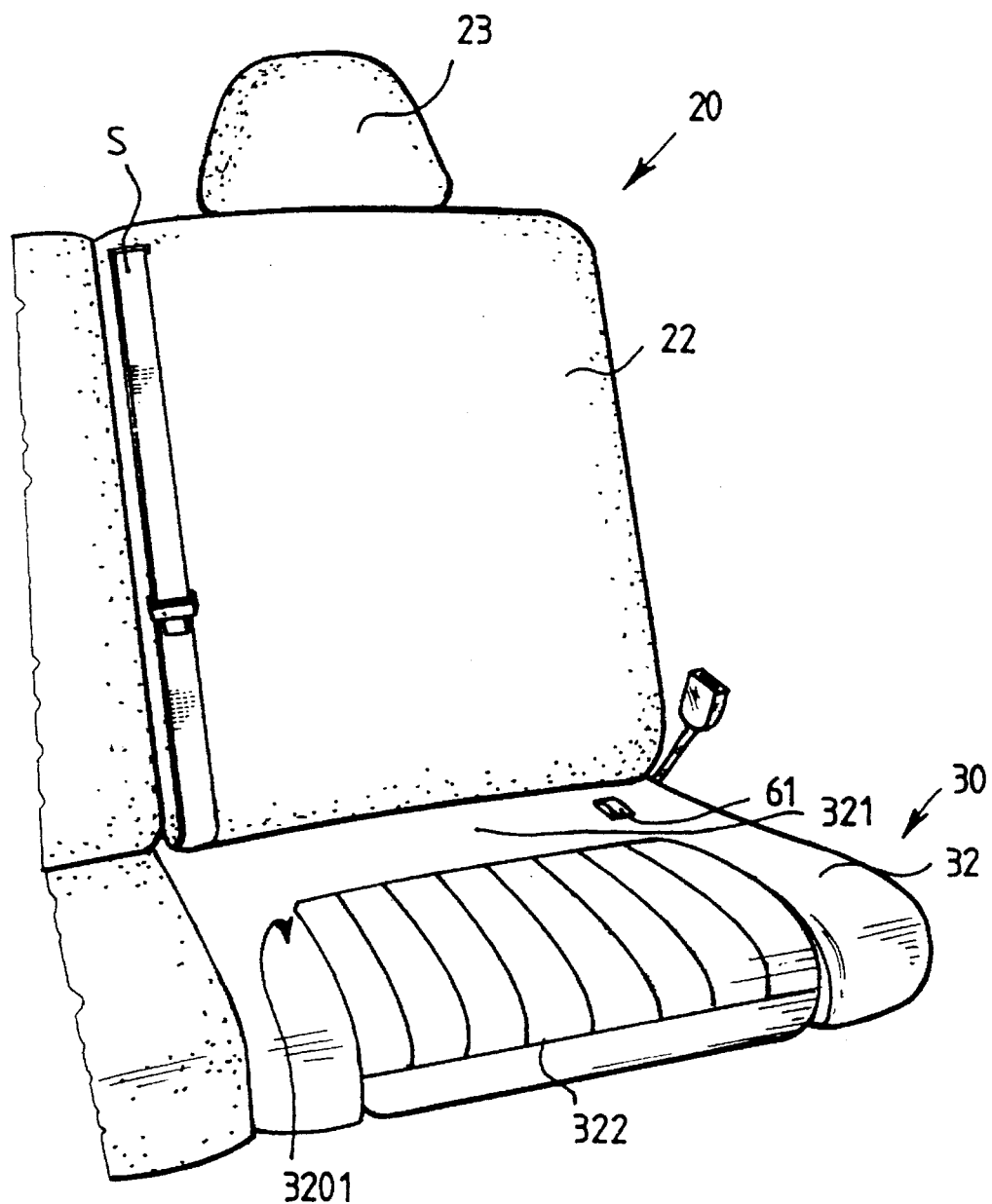
FIG. 1 is a diagrammatic partial perspective view of a convertible seat structure according to the invention in its normal position for an adult passenger illustrated for the particular application to the rear seat of a seat structure for a ground motor vehicle.

Convertible seat structures, and in particular those employed in motor vehicles, for example ground or road motor vehicles, for example for the rear seats, are well known in the art. This is why in the following specification only that which directly or indirectly concerns the invention will be considered. For the rest of the structure, one skilled in the art of the considered field will derive from current conventional arrangements available solutions to particular problems with which he is confronted. In particular, he may usefully refer to the aforementioned documents.

For the convenience of the description there will be described in succession each of the component parts of a convertible seat structure according to the invention before describing if need be the manufacture, the assembly and the utilization thereof.

In the following description, the same reference numeral will always be used for identifying a like element, irrespective of the embodiment or alternative embodiment.

In the following description, a convertible seat structure according to the invention is described in respect of a specific application in a motor vehicle and in particular a ground motor vehicle, particularly for a rear seat. It will be clear that such an application is only given as an illustration and that the information given is applicable whether it concerns a front seat or a rear seat and whether the seat structure is a multiseat structure or otherwise.

A convertible seat structure according to the invention comprises mainly a base 10, a backrest 20, a seat proper 30, an articulation 40, a support 50, a lock 60, if need be prepositioning means 70, and preferably at least one lateral panel 80 with an anchorage device 90.

The base 10 of the seat structure is, if need be, part of the frame of the seat 30 or part of a mount P associated with the seat and even part of the floor on which the seat structure rests.

The backrest 20 comprises a frame 21, preferably a welded metal construction of any suitable conventional type, capable of receiving a cushion 22 of any suitable conventional type comprising upholstery and a covering. If need be, and preferably, such a backrest is provided with a headrest 23 which is removable or otherwise and whose framework carries a padding and a covering and is for example extended by posts engaged in recesses or the like in the backrest, as is conventional in road motor vehicles.

The seat proper 30 comprises a frame 31 and a cushion 32 whose general arrangement is conventional as previously mentioned in respect of the backrest. This cushion 32 is defined in particular by an upper face 3201 and a lower face 3202. This cushion 32 is divided into a fixed rear section 321 close to the backrest 20 and a front section 322 which is mounted to be movable between a normal position in which the seat structure is capable of receiving an adult passenger and an auxiliary position in which the seat is capable of receiving a child passenger, as will be understood hereinafter.

The articulation 40 interconnects the base 10 and the movable front section 322. This articulation 40 comprises a linkage 41 having two opposite end portions 410. One of the opposite end portions 410 is connected to the base 10 by a transverse pin 411 and the other of the opposite end portions 410 is connected to the movable front section 322 by another transverse pin 412. The linkage 41 comprises for example two independent links disposed laterally on each side of the movable front section 322, or comprises a single U-shaped element whose two parallel branches are placed laterally on each side of the movable front section 322 and whose bridge portion 401 which interconnects the two parallel branches constitutes one of the two transverse pins 411, 412, for example the pin 412 which connects the linkage 41 to the movable front section 322. The transverse pins 411 and 412 are made in any suitable conventional manner and comprise for example plain bearings or rolling bearings receiving a pin or stud or the like. This is conventional and there is no need for further description.

The support 50 serves to define the auxiliary position assumed by the seat structure when it is placed in this position in which it is capable of receiving a child passenger. This support is for example formed by the contact of the upper face 3201 of the fixed rear section 321 with the upper face of the movable front section 322, as will be understood hereinafter. The support 50 may also be formed by a stop of any suitable conventional type resulting from the physical contact between two parts, namely a part connected for example to the frame of the movable front section of the seat cushion and a corresponding complementary part associated with the rest of the seat structure, for example with the seat frame or the base for example. It will be understood that such a support may be single or multiple, for example on each side.

Figure 6:
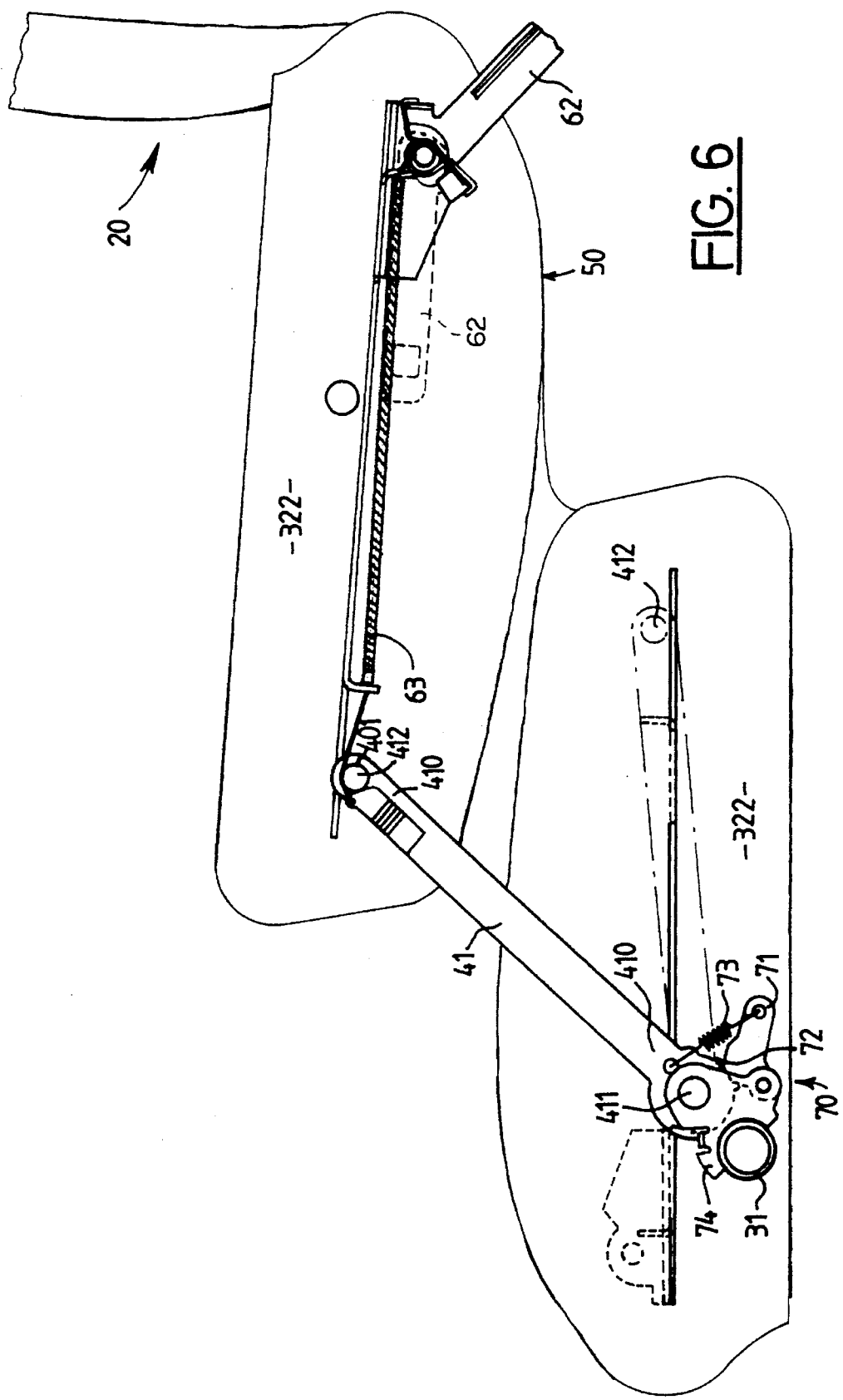
FIG. 6 is a partial diagrammatic view of a seat structure according to the invention.

The lock 60 comprises a keeper 61 and a bolt 62 which are cooperative, one of which is associated with the movable front section 322 whereas the other is associated with the rest of the seat structure. In the illustrated embodiment, the keeper 61 is carried by the fixed rear section 321 of the seat and the bolt 62 is carried by the movable front section 322. It will be understood that the opposite arrangement may be adopted. Preferably, the lock 60 is such that one of the elements comprising the bolt and the keeper is mounted to be movable and retractable. If need be, connection means 63 of any suitable conventional type which is articulated or flexible, such as for example a Bowden cable, connects that one of said elements which is movable so as to cause it to automatically project in an erected position (solid line position of bolt 62 in FIG. 6); for example in opposition to resiliently yieldable means such as a hairpin-shaped spring which normally retains it in a retracted position (dashed line position of bolt 62 in FIG. 6), or inversely, so as to permit an automatic actuation of the lock when the seat structure is made to assume its auxiliary position in which it is capable of receiving a child passenger. Such a lock is for example of a type similar to that usually employed for the buckles of the safety belts normally provided for the seat structures of ground motor vehicles, or of a type similar to that usually employed for maintaining the luggage compartment doors or the engine bonnets of the vehicles closed. It will be understood that such a lock may be single or a multiple lock, for example on each side.

When a lock of the safety belt buckle type is used, such a lock may be in the form of an "extension" or the like which is mounted on the movable front section and is provided at one of its ends with a bolt and at the other end with a keeper. This bolt of the extension is adapted to cooperate and engage with the keeper of a safety belt buckle fixed to a stem connected to the floor of the vehicle, as is conventional and illustrated in FIGS. 1 and 2, and the keeper of the extension is adapted to receive the bolt or plate of the safety belt buckle with which the seat structure is normally equipped.

In the foregoing a support 50 and a lock 60 were described as being distinct. It will be clear that these two component parts may be assembled in a single or multiple mechanism which simultaneously carries out these two functions.

The prepositioning means 70, when employed, are interposed between the base 10 and the articulation 40 and they act on the linkage 41 in such manner as to maintain the movable front section 322 in at least one of the two normal and auxiliary positions of the seat structure and preferably in both thereof. These prepositioning means 70 comprise for example a pivotable pawl or the like 71 and a double-action rotatable ratchet wheel 72 or the like placed on a sector of a circle towards which the pawl is biased by a spring 73 so that it normally comes into contact with the ratchet wheel for reasons which will be understood hereinafter. These prepositioning means 70 further comprise a support 74 which is fixed in any suitable manner, such as welding or bonding for example, to the seat frame 31. Instead of a pawl and ratchet wheel mechanism a spring catch or the like may be employed.

Each lateral panel 80 is retractable in such manner as to be movable between a closed up position it can assume when the movable front section 322 is in the normal position and opened out position which it can assume when the movable front section 322 is in the auxiliary position for reasons which will be understood hereinafter. According to one embodiment, each lateral panel 80 is fixed to the movable front section 322 and is made up of relatively rigid panel portions 81 which are interconnected by flexible folds 82 so arranged that in the closed up position the panel portions 81 are in contact with one another and bear against the lower face 3202 of the movable front section 322 in the normal position, and in such manner that, in the opened out position, the panel portions 81 form a wall capable of maintaining a child seated on the movable front section 322 in the auxiliary position. Preferably, the lateral panels are interconnected by a back 83 which is also retractable in the same manner or in a manner similar to that of the lateral panels. In another embodiment, each lateral panel and/or back is made of a flexible sheet which may be rolled up and is preferably mounted on a winding roll having an automatic return of any suitable known type, if need be with an inertia locking device for example of a type similar to those employed for safety belts mounted on road motor vehicles. Such a winding roller is fixed for example to the movable front section 322 or even to the rest of the seat structure so that for example the free end of the sheet can be seen and seized in the interstice between the movable front section in the normal position and the rest of the seat structure. If need be, at least one of the lateral panels 80 has an opening 801 for the passage of a safety belt S for reasons explained hereinafter.

The anchorage device 90 is carried by at least one of the lateral panels 80 so as to retain the lateral panel or panels in the opened out position and, as the case may be, participate in or aid the opening out of the panels which were initially in the closed up position. Such an anchorage device 90 comprises a retaining member 91 adapted to cooperate with the backrest 20. Preferably, the retaining member 91 cooperates with the headrest 23. This retaining member 91 is for example in the form of a strap 92 which is elastic or otherwise and is in one piece or in two sections which may be united by means of a clasp. This retaining member 91 is for example simply passed behind the headrest as illustrated or hooked to at least one of the posts of the headrest or of the recesses receiving the posts.

All the component parts of a convertible seat structure according to the invention are made of conventional metallic and/or synthetic materials which are worked and shaped in accordance with conventional techniques. All these component parts are assembled and mounted in the manner clearly shown in the Figures.

The use of a seat structure according to the invention will now be explained.

It will be assumed that a convertible seat structure according to the invention is initially in the position illustrated in FIG. 1, i.e. in its normal position in which it is capable of receiving for example an adult passenger and in which it is normally maintained by the prepositioning means.

To shift the seat structure from the position shown in FIG. 1 to its auxiliary position shown in FIG. 2 in which it is capable of receiving a child passenger, one proceeds as follows. The movable front section is taken hold of and made to leave the position illustrated by a succession of single dot-dash lines in FIG. 3, by overcoming the resisting torque developed by the prepositioning means, so that it takes up an intermediate position by rotation about the two transverse pins, as for example illustrated by a succession of triple dot-dash lines in this Figure. Thereafter, it is sufficient to turn the movable front section over to an upper face-down position solely about the pin which connects it to the linkage so that it takes up the position illustrated in full lines. The prepositioning means act in particular on the articulation in such manner that the linkage now maintains the movable front section no longer in the extension of the fixed rear section but in the position which permits turning the movable front section over to the upper face-down position thereof. This turning over of the movable front section acts if need be on said connection means which then causes the erection of the bolt to a position in which it is capable of naturally engaging the slot of the keeper of the lock and thereby automatically immobilizing the movable front section in the position illustrated in FIG. 3. It will be observed that, upon the rotation and the turning over of the movable front section, the lateral panels, if need be combined with the back, remain closed up and retracted for example against the lower face of the movable front section.

Figure 2:
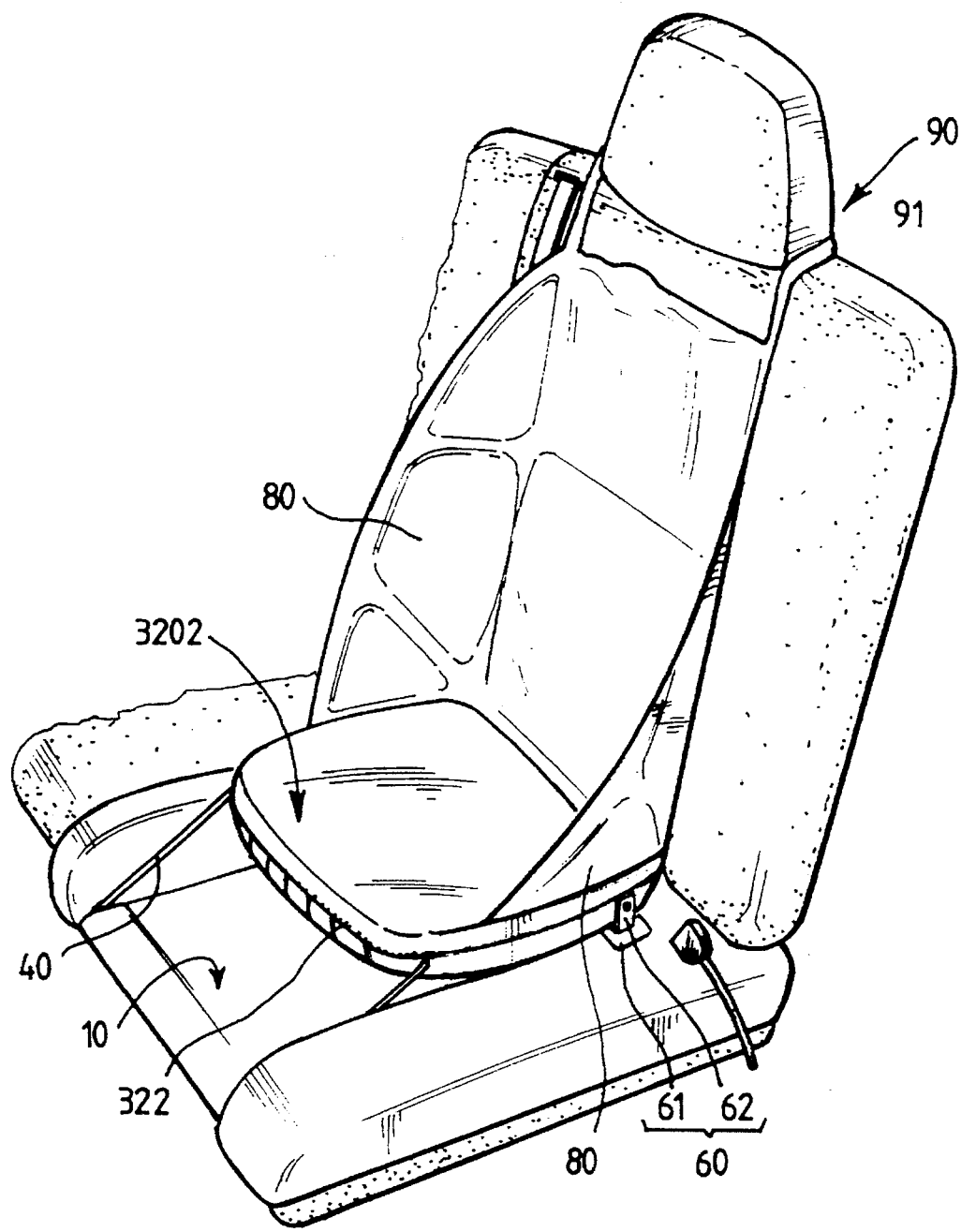
FIG. 2 is a similar view of the seat structure of FIG. 1 at a different angle in the auxiliary position for a child passenger.
Figure 3:
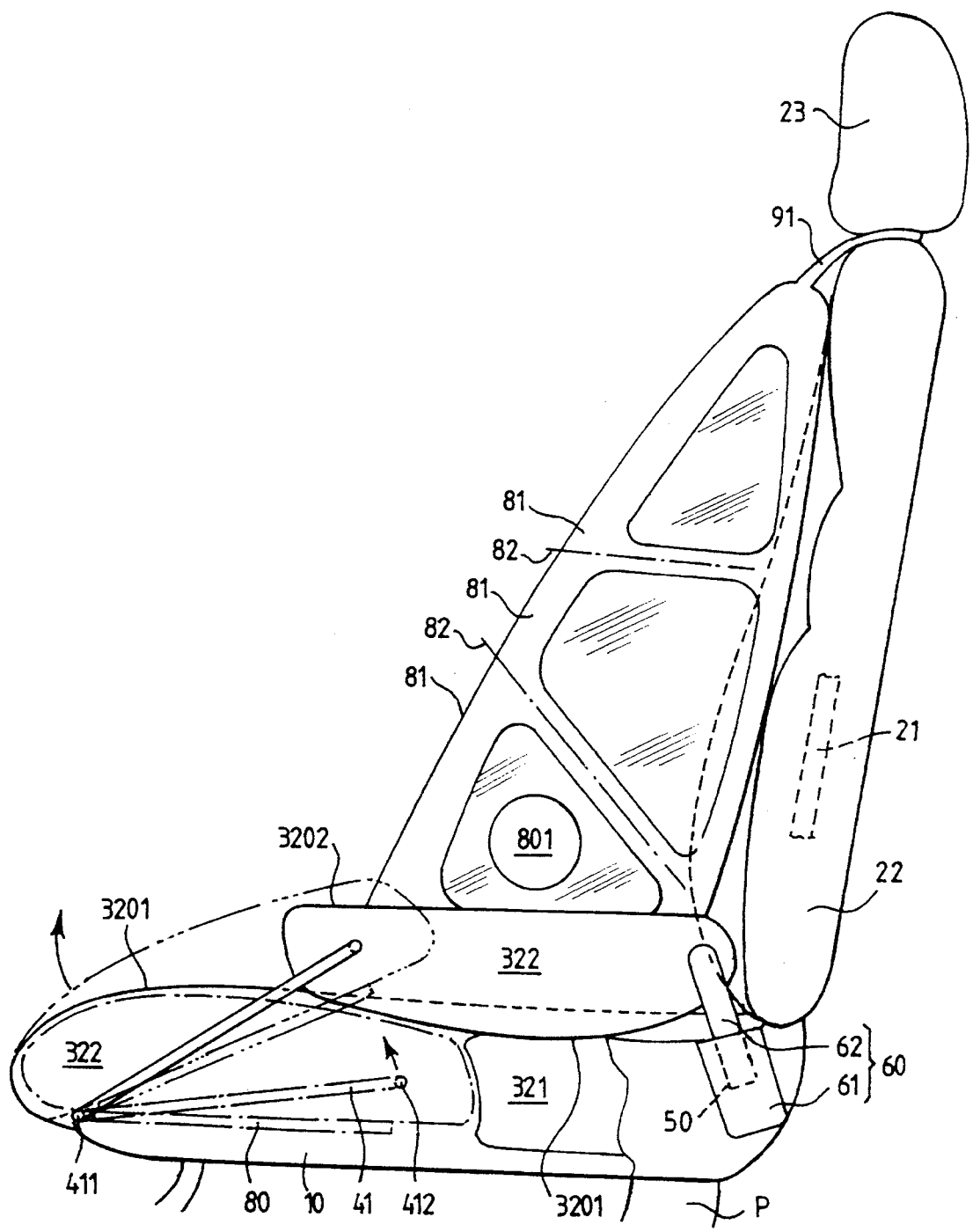
FIG. 3 is a diagrammatic side elevational view of the seat structure according to the invention in the position it occupies in FIG. 2.
Figure 4C:
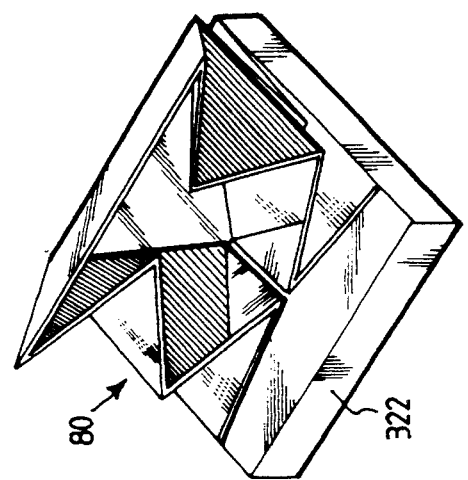
FIG. 4 illustrates diagrammatically in perspective views 4A, 4B and 4C a component part of a seat structure according to the invention in the various positions it occupies in the use of the seat structure.
Figure 4B:
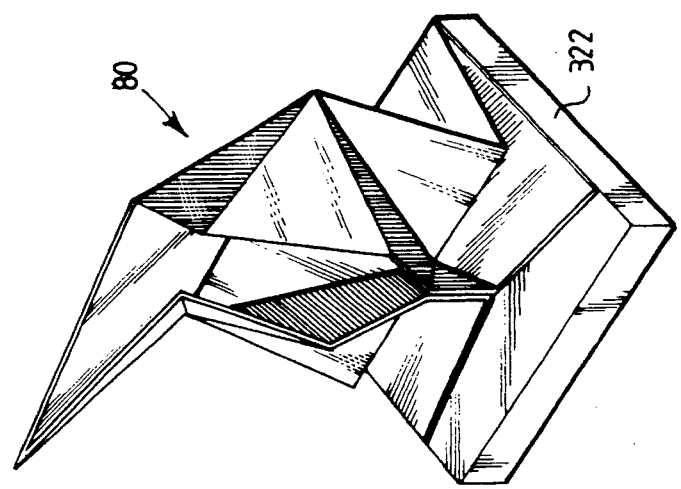
Figure 4A:
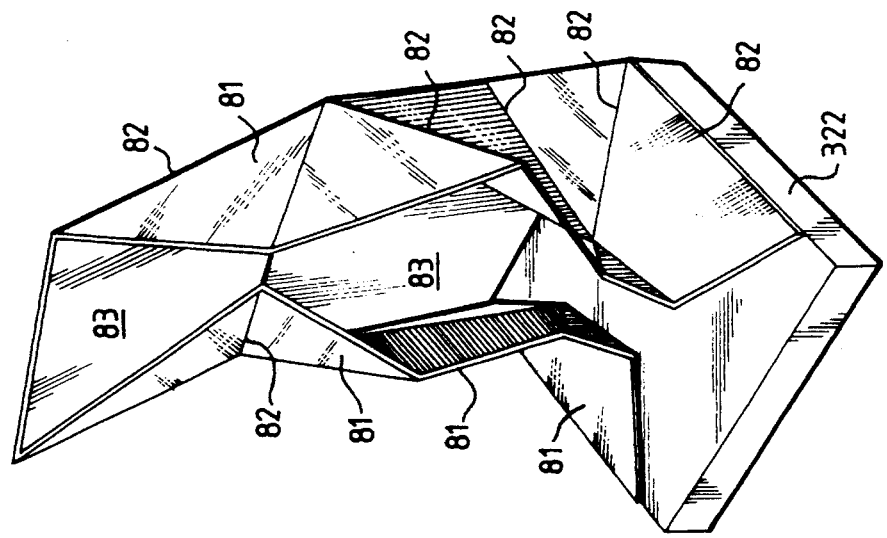
Figure 5C:
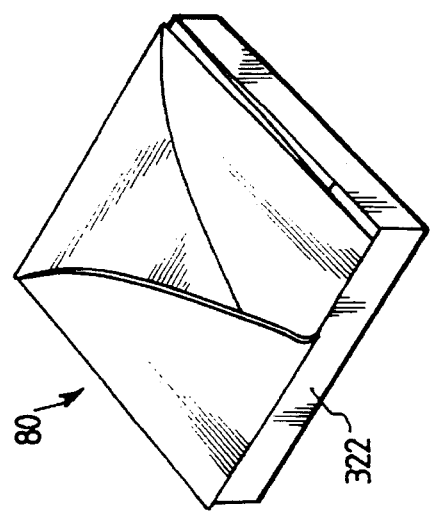
FIG. 5 is a view similar to that of FIG. 4 which illustrates in FIGS. 5A, 5B and 5C an alternative embodiment of a component part of a seat structure according to the invention.
Figure 5B:
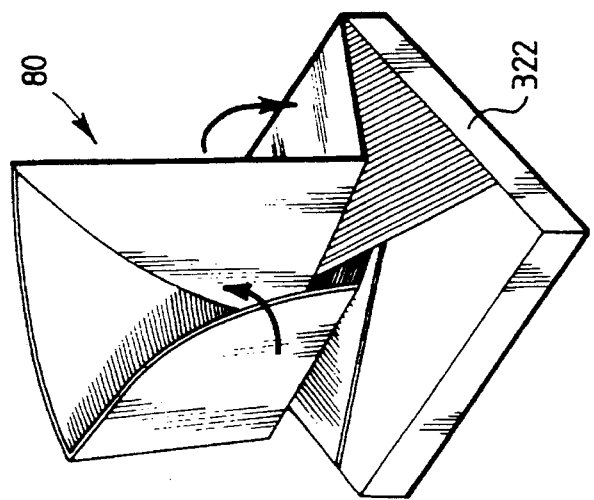
Figure 5A:
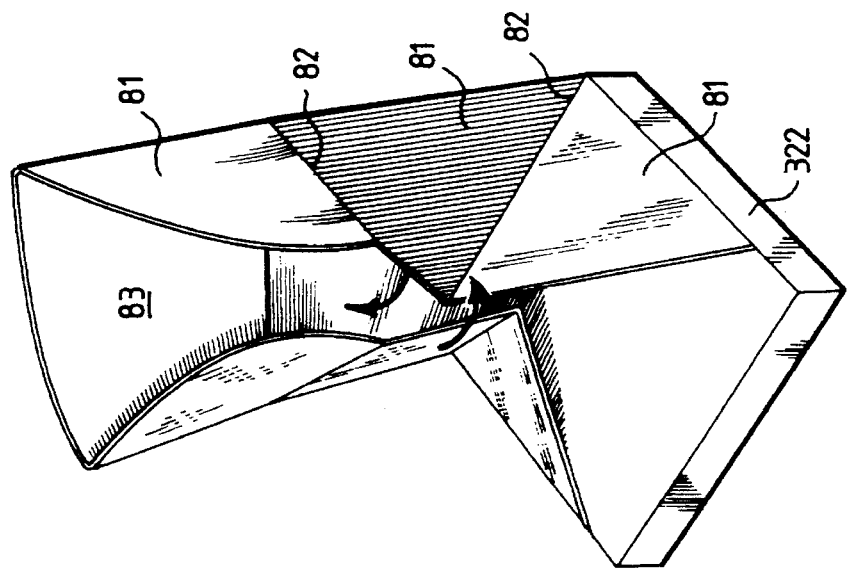

It is then sufficient to take hold of the retaining member of the anchorage device carried by at least one of the lateral panels to cause them to pass from their closed up position in which they are in contact with one another and bear against the lower face of the movable front section to the opened out position illustrated in FIG. 2 or in FIG. 3 in full lines. The opening out or the folding up is effected for example as illustrated in the various diagrammatic views of FIGS. 4 and 5. With the opening out terminated, it is sufficient to fix the anchorage device to the backrest of the seat structure, for example to its headrest. The convertible seat structure according to the invention is then capable of receiving a child passenger.

It will be observed that when at least one of the lateral panels is provided with an opening, this opening permits the passage of the safety belt the seat structure is normally provided with so as to maintain a child seated on the seat structure in the auxiliary position in an effective manner which satisfies safety standards with no need to employ a special safety belt.

When it is desired to put the seat structure back from the auxiliary position illustrated in FIG. 2 into the normal position illustrated in FIG. 1, it is sufficient to proceed in the opposite order after opening the lock and after retraction of the lateral panels to enable the movable front section to be turned over and then put into alignment with the fixed rear section.

The lateral panels are for example made of a strong fabric of a suitable material and if need be "prestarched" in the region of the folds in the manner usually employed in the clothing industry for permanently marking the pleats of trousers. A complex structure made of a core of polyethylene foam covered with two layers of fabric and obtained by thermocompression with parts of reduced thickness which form the folds may also be used. If need be, these folds may have a certain natural elasticity so that when the anchorage device is released from the backrest, the panel portions of the lateral panels have an inherent and spontaneous tendency to change from the opened out position to the closed up position. This change from the opened out position to the closed up position is achieved automatically when a winding roller having an automatic return of the type mentioned hereinbefore is used.

It will be seen that the invention provides a raised seat incorporated in the seat structure.

It will be observed that the location at which the transverse pins are placed respectively on the base and on the movable front section is a function of the size of the linkage and of the shape of the seat structure proper as concerns in particular the thickness or the height of the seat cushion and the dimensions pertaining to the movable front section and fixed rear section. Likewise, it will be observed that the initial or final rotation preceding or following the turning over of the movable front section may be effected in either direction in accordance with the chosen location.

It will be observed that the cushion provided for the movable front section may be made in different ways for the upper face and the lower face both as concerns its outer apparent and visible covering whose appearance and/or nature may be different and as concerns its inner upholstery whose consistency and/or density and elasticity may be different, whence an improvement in the appearance and/or the comfort which takes into account in particular differences in the masses and morphologies existing between an adult passenger and a child passenger. There is in particular achieved in this way a differentiated comfort adapted to each child passenger or adult passenger without adversely affecting in any way the comfort usually required for an adult.

It will also be observed that, in the auxiliary position of the seat structure, a child seated on the movable front section of the tilted and turned over seat has a footrest constituted by the part of the base thus uncovered, whence an improvement in the comfort.

It will be observed that, owing to the small amount of space taken up in particular by the linkage, the implantation of the seat structure is markedly facilitated.

With the convertible seat structure according to the invention it is possible to obtain from a seat structure normally intended for an adult a comfortable seat structure for a child which provides a good lateral maintenance in the region of the backrest and guarantees maximum safety in particular by the use of the safety belt normally existing in the vehicle for the considered seat structure.

The foregoing reveals the distinctive features of the invention, the interest of the latter and the resulting advantages.

What is claimed is:

1. Convertible seat structure comprising in combination: a seat base, a backrest with a frame, a cushion received by said frame, a seat with a frame, a cushion received by said seat frame and having an upper face and a lower face and divided into a fixed rear section close to said backrest and a movable front section, each section having an upper face and a lower face, an articulation means for mounting said front section in such manner that said front section is movable between a normal position in which said front section is into alignment with the rear section and in which said seat structure is capable of receiving an adult passenger and an auxiliary position in which said front section is located above said rear section and in which said seat structure is capable of receiving a child passenger, said articulation means interconnecting said base and movable front section and comprising a linkage having two opposite end portions, at least a first transverse pin connecting one of said end portions to said seat base, at least a second transverse pin connecting the other of said end portions to said movable front section, whereby, said upper face of said front section is facing upwardly when said front section is in said normal position, and said upper face of said front section is facing downwardly when said front section is in said auxiliary position as a result of flipping over said front section by rotation about said two transverse pins and tilting said front section by a rotation about said transverse pin connecting said linkage to said front section, said seat structure further comprising a support means for positioning said front section when it is in said auxiliary position, and a lock comprising two cooperative elements, one of said elements of said lock being interconnected with said movable front section and the other element of said elements of said lock being interconnected with a fixed part of said seat structure, said lock being adapted to immobilize said movable front section when it is in said auxiliary position.

2. Seat structure according to claim 1, wherein said seat base is a part of said frame of said seat.

3. Seat structure according to claim 1, in combination with a mount for resting said seat structure on a floor, said seat base being part of said mount.

4. Seat structure according to claim 1, wherein said seat base is part of a floor.

5. Seat structure according to claim 1, wherein said linkage comprises two links disposed laterally on each side of said movable front section, each link having two opposite end portions, a first transverse pin connecting one of said end portions to said seat base, a second transverse pin connecting the other of said end portions to said movable front section.

6. Seat structure according to claim 1, wherein said linkage comprises a U-shaped element having two parallel branches and a bridge portion interconnecting said branches, whereby each branch has a free end and an interconnected end, the free and interconnected ends of the branches defining respectively the two opposite ends portions of said linkage said branches being placed laterally on each side of said movable front section, said bridge portion constituting a first (respectively second) transverse pin common to both branches, and two second (respectively first) pins being intended to connect said free ends of said two branches.

7. Seat structure according to claim 1, wherein said support means comprises contact means defined by the upper face of said fixed rear section and the upper face of said movable front section which cooperate when said movable front section is in said auxiliary position.

8. Seat structure according to claim 1, wherein said support means comprises a stop.

9. Seat structure according to claim 1, wherein an element of said lock is in the form of a keeper and an the other element of said lock is in the form of a bolt.

10. Seat structure according to claim 9, wherein one of said lock elements is movably and retractably mounted on one of said front section and said fixed part.

11. Seat structure according to claim 10, comprising means interconnected with said movable lock element to cause it to project in an erected position and permit an automatic engagement of said lock when said movable front section is in said auxiliary position.

12. Seat structure according to claim 1, comprising prepositioning means having a disengageable blocking device connected with said seat base and said linkage for blocking the linkage with respect to the seat base such as to maintain said movable front section in at least one of said normal and auxiliary positions.

13. Seat structure according to claim 1, comprising at least one retractable lateral panel which is associated with said movable front section and is movable between a closed up position it is capable of assuming when said movable front section is in said normal position and wherein it bears against the lower face of said front section, and an opened out position it is capable of assuming when said movable front section is in said auxiliary position and wherein it forms a wall which extends from the lower face of said front section and which is capable of maintaining in position a child seated on said movable front section when said front section is in auxiliary position.

14. Seat structure according to claim 13 wherein said at least one retractable lateral panel is connected to said movable front section and comprises relatively rigid panel portions and flexible folds which interconnect said rigid panel portions and are arranged in such manner that, in said closed up position, said panel portions are in contact against one another and bear against said lower face of said movable front section in said normal position and in such manner that, in said opened out position, said panel portions form said wall.

15. Seat structure according to claim 13, wherein said at least one lateral panel is provided with at least one opening for the passage of a safety belt.

16. Seat structure according to claim 13, comprising an anchorage device carried by said at least one lateral panel for retaining said at least one lateral panel in said opened out position, said anchorage device being attachable to said backrest.

17. Seat structure according to claim 16, wherein said anchorage device comprises a retaining member attachable to said backrest.

18. Seat structure according to claim 17, further comprising a headrest combined with said backrest, said retaining member being attachable to said headrest.

19. Combination comprising a motor vehicle and a seat structure which comprises in combination: a seat base, a backrest with a frame, a cushion received by said frame, a seat with a frame, a cushion received by said seat frame and having an upper face and a lower face and divided into a fixed rear section close to said backrest and a movable front section, each section having an upper face and a lower face, an articulation means for mounting said front section in such manner that said front section is movable between a normal position in which said front section is into alignement with the rear section and in which said seat structure is capable of receiving an adult passenger and an auxiliary position in which said front section is located above said rear section and in which said seat structure is capable of receiving a child passenger, said articulation means interconnecting said base and movable front section and comprising a linkage having two opposite end portions, at least a first transverse pin connecting one of said end portions to said seat base, at least a second transverse pin connecting the other of said end portions to said movable front section, whereby, said upper face of said front section is facing upwardly when said front section is in said normal position, and said upper face of said front section is facing downwardly when said front section is in said auxiliary position as a result of flipping over said front section by rotation about said two transverse pins and tilting said front section by a rotation about said transverse pin connecting said linkage to said front section, said seat structure further comprising a support means for positioning said front section when it is in said auxiliary position, and a lock comprising two cooperative elements, one of said elements of said lock being interconnected with said movable front section and the other element of said elements of said lock being interconnected with a fixed part of said seat structure, said lock being intended to immobilize said movable front section when it is in said auxiliary position.

20. Combination according to claim 19, wherein said seat structure is for a rear seat of said motor vehicle.

* * * * *